(12) United States Patent
Huang et al.

(10) Patent No.: US 8,777,113 B2
(45) Date of Patent: Jul. 15, 2014

(54) INTEGRATED CIRCUIT FILM FOR SMART CARD AND MOBILE COMMUNICATION DEVICE

(75) Inventors: Shaw Wen Huang, Hsinchu (TW); Kuan Hung Lu, Hsinchu (TW); Chih Hong Tsai, Hsinchu (TW); Chi-Wang Pang, Hsinchu (TW)

(73) Assignee: MXTRAN Inc., Hsinchu (TW)

( * ) Notice: Subject to any disclaimer, the term of this patent is extended or adjusted under 35 U.S.C. 154(b) by 16 days.

(21) Appl. No.: 13/476,913

(22) Filed: May 21, 2012

(65) Prior Publication Data

US 2012/0292395 A1  Nov. 22, 2012

(30) Foreign Application Priority Data

May 20, 2011  (TW) .............................. 100209175 U

(51) Int. Cl.
 *G06K 19/06* (2006.01)
(52) U.S. Cl.
 USPC ........................................................ 235/492
(58) Field of Classification Search
 USPC ........................................................ 235/492
 See application file for complete search history.

(56) References Cited

U.S. PATENT DOCUMENTS

| 4,868,373 | A  | * | 9/1989 | Opheij et al. ................. 235/380 |
| 6,769,619 | B2 | * | 8/2004 | Zafrany et al. ................ 235/487 |
| 7,198,199 | B2 |   | 4/2007 | Ho |
| 7,303,137 | B2 |   | 12/2007 | Ho |
| 7,395,973 | B2 |   | 7/2008 | Ho |
| 2004/0129787 | A1 | * | 7/2004 | Saito et al. ..................... 235/492 |
| 2007/0262156 | A1 |   | 11/2007 | Chen et al. |
| 2009/0061933 | A1 |   | 3/2009 | Lo et al. |
| 2011/0149533 | A1 |   | 6/2011 | Luo et al. |

OTHER PUBLICATIONS

Webpage, http://www.vibo.com.tw/CWS/Consumer_05_08_08,,,,.html.

* cited by examiner

*Primary Examiner* — Jamara Franklin
(74) *Attorney, Agent, or Firm* — Liu & Liu

(57) ABSTRACT

An integrated circuit film for a smart card, such as a Micro SIM card or a Mini UICC card, is provided. The integrated circuit film includes a flexible print circuit board (FPC) and an integrated circuit chip, and the integrated circuit chip has an ATR (Answer to Reset) signal generating device. When a terminal issues a Reset signal, this Reset signal is sent to the smart card and the ATR signal generating device, respectively via circuits of the FPC, whereby the ATR signal generating device generates ATR signal and send back to the terminal.

15 Claims, 11 Drawing Sheets

INTEGRATED CIRCUIT FILM FOR SMART CARD AND MOBILE COMMUNICATION DEVICE

BACKGROUND OF THE INVENTION

1. Field of the Invention

The present invention relates to an integrated circuit (IC) film for a smart card and relates to a mobile communication device.

2. Description of the Prior Art

In the prior art, whether or not a mobile phone has certain functions or provides certain communication services (e.g., mobile e-banking services) usually depends the support of its SIM/USIM card. To overcome the limitations imposed by the conventional SIM/USIM/cards, solutions have been proposed as in Taiwan Patent Application No. 94106675, which is entitled "Dual Universal IC Card (UICC) System for a Portable Device"; Taiwan Patent Application No. 94217529, which is entitled "Dual IC Card System"; U.S. Patent Application Publication No. 2007/0262156, which is entitled "Functional Module Improvement Structure for Expanded and Enhanced SIM Card"; and U.S. Patent Application Publication No. 2009/0061933, which is entitled "Multiple Interface Card in a Mobile Phone".

Also, SIM/USIM card films for use with mobile phones are now available on the market, such as the V-Tone card issued by VIBO Telecom Inc. of Taiwan (see http://www.vibo.com.tw/CWS/Consumer_05_08_08,,,,.html). The V-Tone card or the like is primarily a film which can be affixed to a conventional SIM card and placed together therewith into a mobile phone so that, by operating the STK menu of the mobile phone, a user can use functions or application programs that are not provided by the SIM card itself. Regarding this kind of conventional films, please refer to U.S. Pat. Nos. 7,198,199, 7,303,137, 7,395,973 or Taiwan Patent Application No. 98144154, which is applied by the same applicant of present invention.

SUMMARY OF THE INVENTION

In an embodiment of the present invention, an integrated circuit film for a smart card, such as a Micro SIM card or a Mini UICC card, is provided. The integrated circuit film includes a flexible printed circuit board (FPC) and an integrated circuit chip (IC chip). The IC chip has an ATR (Answer to Reset) signal generating device. When a terminal generates a reset signal, the reset signal is sent to the smart card and the ATR signal generating device of the IC chip, respectively via circuits of the FPC, whereby the ATR signal generating device generates and sends an ATR signal to the terminal.

The features and advantages of the present invention will become more apparent after reviewing the following description of some illustrative embodiments and the appended claims.

BRIEF DESCRIPTION OF THE DRAWINGS

The present invention as summarized above will now be described with reference to the accompanying drawings of specific embodiments so as to demonstrate the subject matter and advantages of the present invention with additional clarity and details. However, it is to be understood that the embodiments disclosed herein are only the typical embodiments and are not intended to limit the scope of the present invention. In the drawings.

DETAILED DESCRIPTION OF THE EMBODIMENTS

Figure 1:
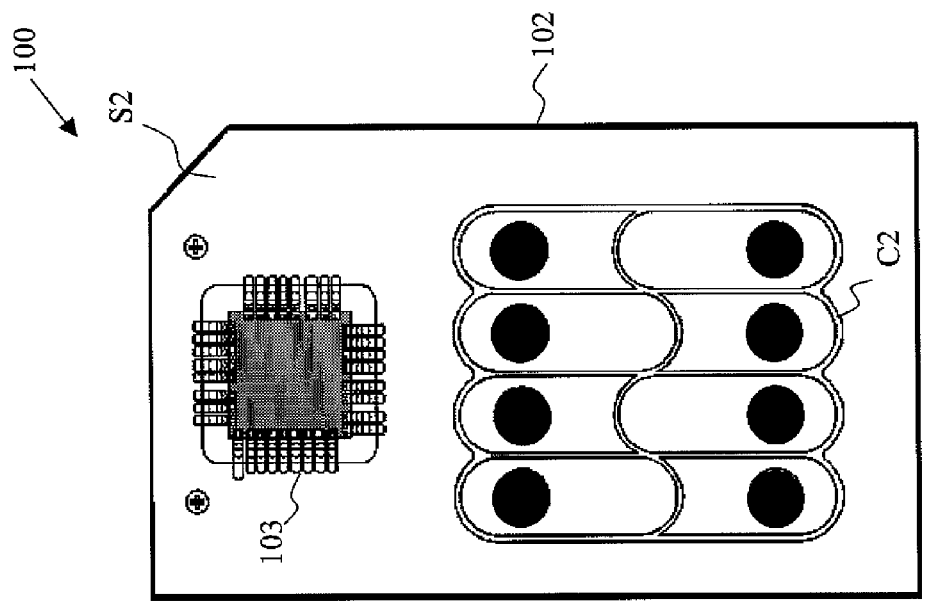
FIG. 1 is a schematic view of an integrated circuit film according to a specific embodiment of the present invention.
Figure 1:
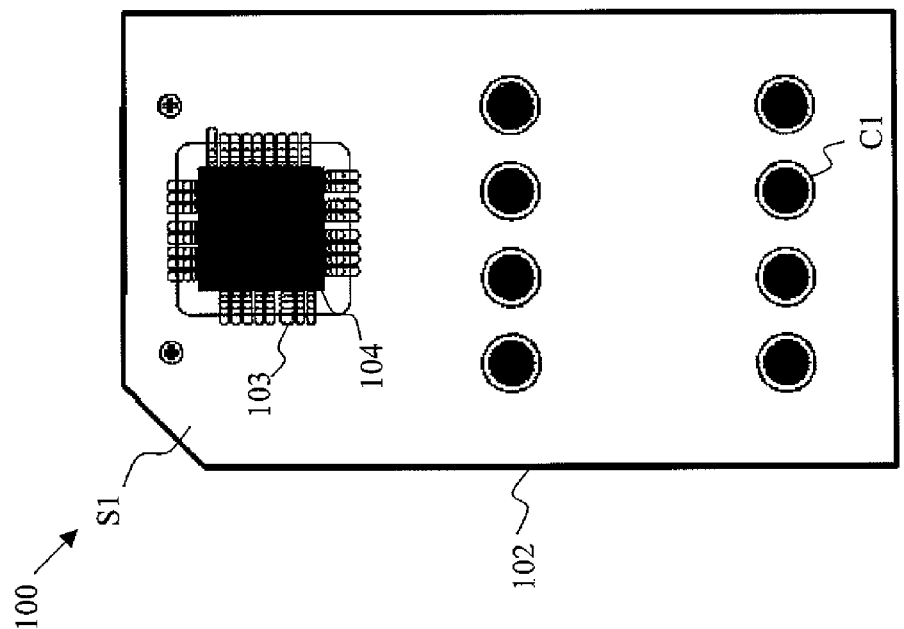

FIG. 1 shows a front view and a back view of an IC film 100 according to an embodiment of the present invention. The IC film 100 includes an FPC board 102, a first set of electrical contacts C1, a second set of electrical contacts C2, and an IC chip 104. The FPC board 102 has a first side S1 and a second side S2 which are opposite each other. The first set of electrical contacts C1 are disposed on the first side S1 and are configured for electrical connection with a smart card 200 (shown in FIG. 3). The second set of electrical contacts C2 are disposed on the second side S2. The IC chip 104 is disposed on the FPC board 102 and bonded to leads 103 of the FPC board 102 so as to make electrical connection.

Figure 2:
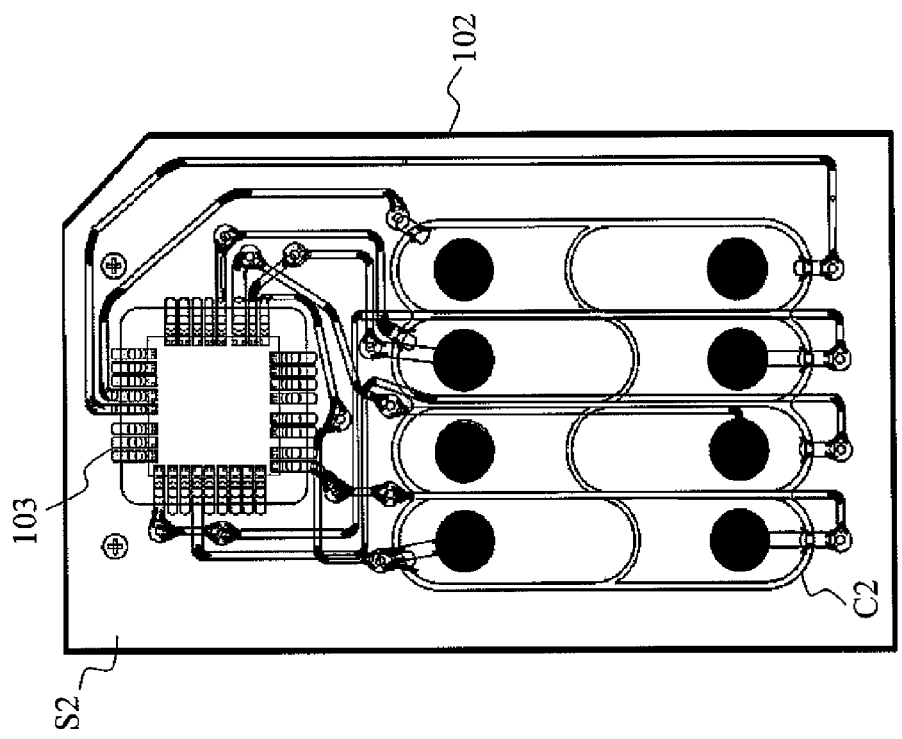
FIG. 2 is a schematic view of a flexible printed circuit board according to a specific embodiment of the present invention.

FIG. 2 further shows a front view and a back view of the FPC board 102. As shown in FIG. 2, the first set of electrical contacts C1 on the first side S1, the second set of electrical contacts C2 on the second side S2, and the IC chip 104 are electrically connected to one another through circuits of the FPC board 102. The circuits of the FPC board 102 may be formed by printing or chemical deposition.

In FIG. 1 and FIG. 2, the first set of electrical contacts C1 on the first side S1 are of a bump structure (referring also to FIG. 4) while the second set of electrical contacts C2 on the second side S2 are of a recess structure. In addition, the locations of the first set of electrical contacts C1 on the FPC board 102 correspond to those of the second set of electrical contacts C2. However, in other embodiments not shown in the drawings, the first set of electrical contacts C1 and the second set of electrical contacts C2 may also be located otherwise or have different shapes and structures, provided that the electrical contacts C1 can make electrical contact with the smart card to which the IC film 100 is affixed and that the electrical contacts C2 can make electrical contact with an accessing device (not shown) commonly used for smart cards. The present invention has no limitations on the locations, shapes, and structures of the first and second sets of electrical contacts C1 and C2.

Preferably, as shown in FIG. 1 and FIG. 2, the positions and structures of the first set of electrical contacts C1 conform to the ISO 7816-2 standard so as for the first set of electrical contacts C1 to be electrically connected to a smart card conforming to the ISO 7816 standard. Also, the positions and structures of the second set of electrical contacts C2 preferably conform to the ISO 7816-2 standard so as for the second set of electrical contacts C2 to be electrically connected to a smart card accessing device (e.g., the SIM/USIM/UIM/RUIM card slot of a mobile phone or a smart card reader) conforming to the ISO 7816 standard.

Figure 3:
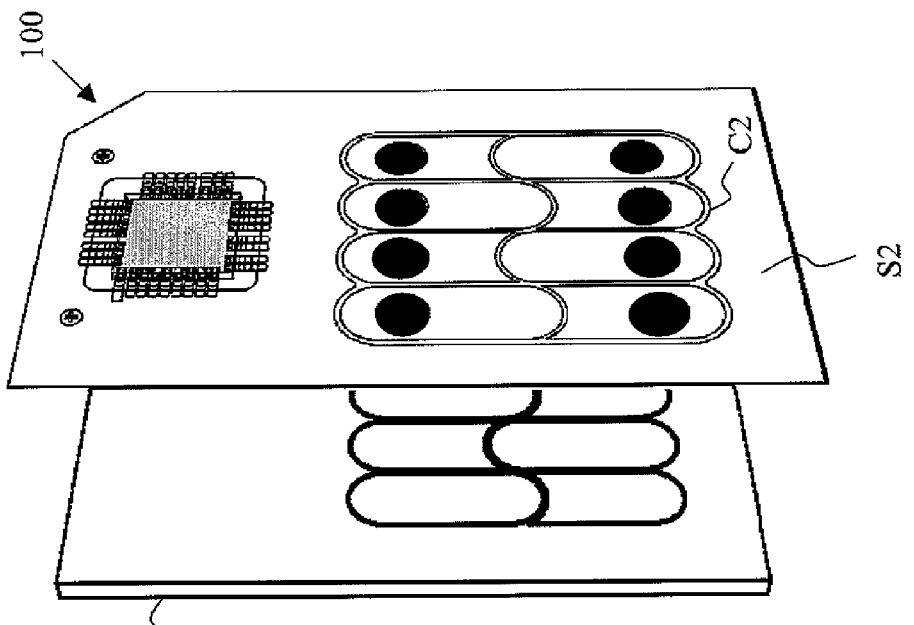
FIG. 3 is a schematic view of the integrated circuit film and a smart card according to a specific embodiment of the present invention.
Figure 3:
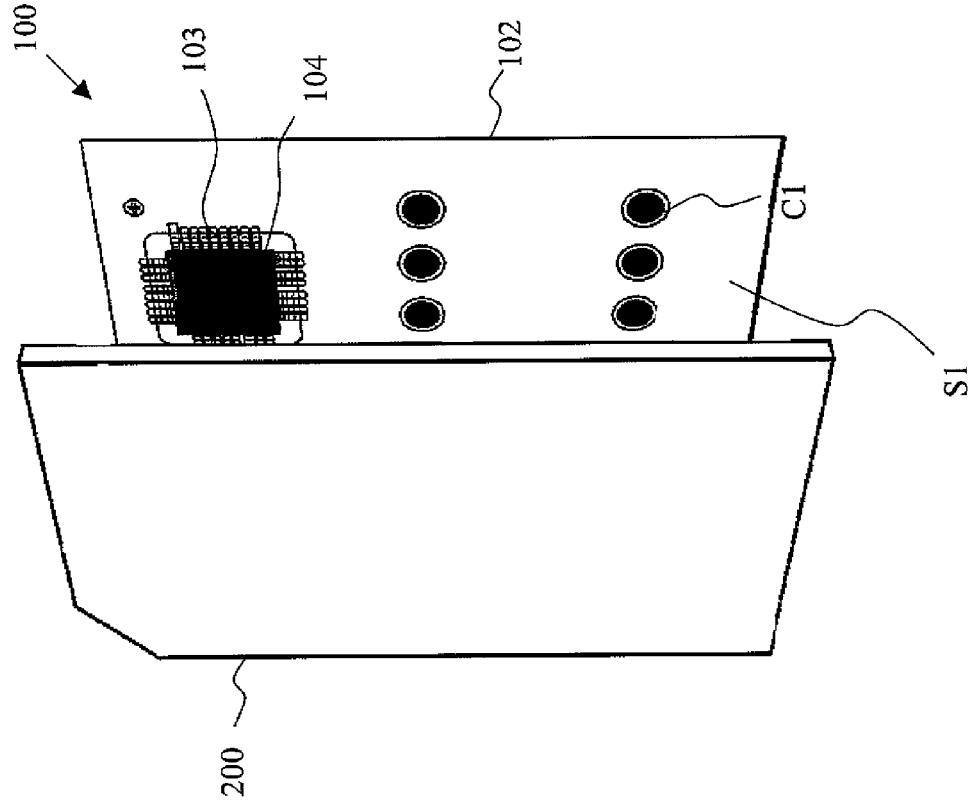
Figure 4:
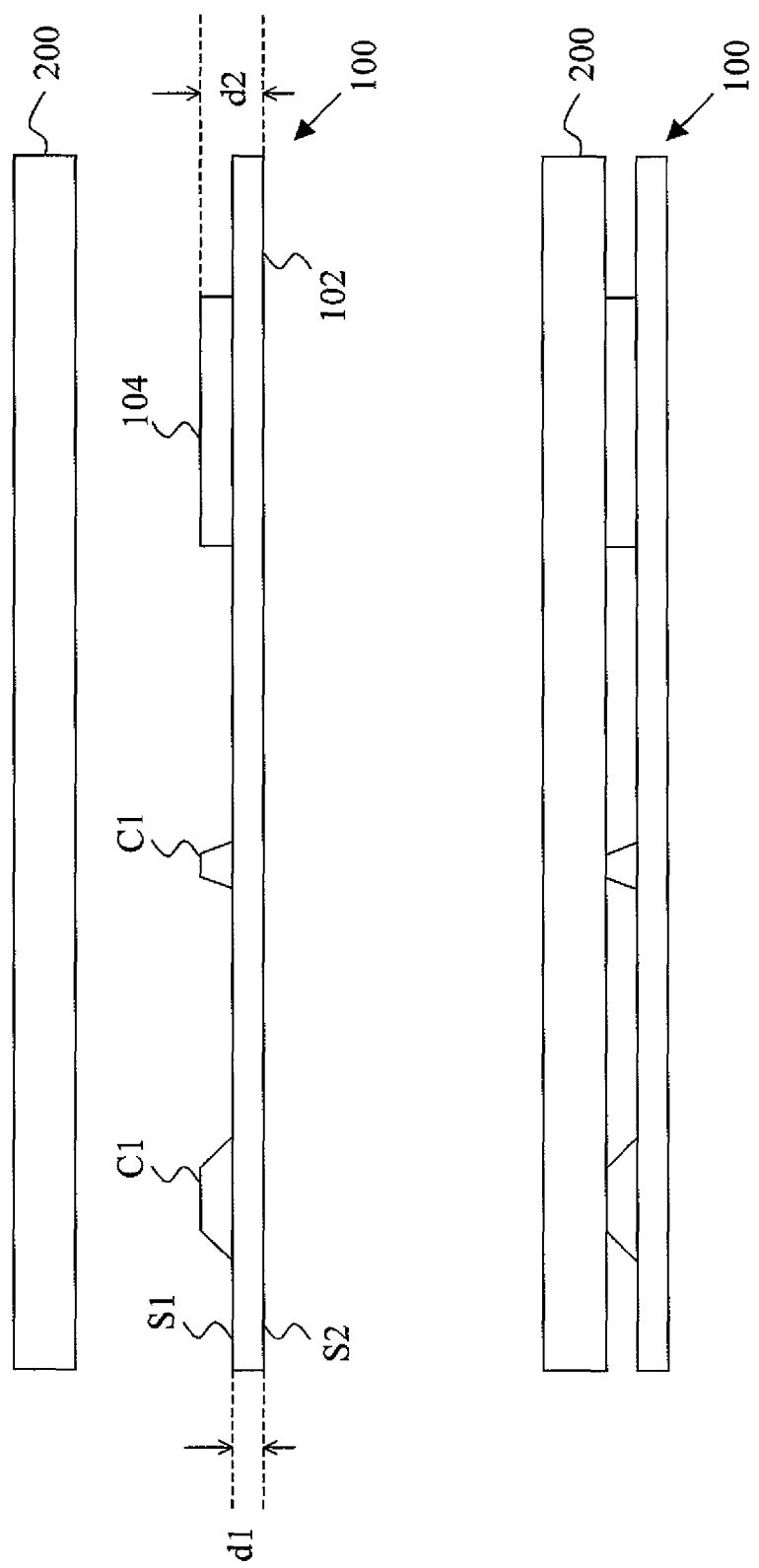
FIG. 4 is a side view of the integrated circuit film and the smart card according to a specific embodiment of the present invention.

As shown in FIG. 3 and FIG. 4, the IC chip 104 is preferably disposed on the first side 51, i.e., the side facing the smart card 200. The first side 51 is provided with a double faced adhesive tape (e.g., 3M™ VHB™ Adhesive Transfer Tape F-9460PC) for adhering to a surface of the smart card 200. When the IC film 100 is affixed to the smart card 200, the IC chip 104 as a whole is located outside the surface of the smart card 200.

The IC chip 104 is directly bonded to the leads 103 of the FPC board 102 by an anisotropic conductive film (ACF) or by gold-to-gold interconnection (GGI). In this embodiment, the IC chip 104 is not covered with any package molding material (e.g., epoxy resin) but is coated only with a layer of UV adhesive to enhance the fixing effect. Thus, the thickness of the IC chip 104 is significantly reduced, and there is no need to bore or cut the smart card 200 when it is desired to affix the IC chip 104 thereto.

A point to note is that the IC chip 104 can also be covered with a package molding material, and the present invention is not restrictive of this technical feature. If the IC chip 104 is covered with a package molding material, the IC chip 104 can be electrically connected to the FPC board 102 by means of a ball grid array (BGA) or direct wire bonding rather than an anisotropic conductive film (ACF) or gold-to-gold interconnection (GGI).

As shown in FIG. 4, the FPC board 102 and the IC chip 104 have a combined thickness d2 not greater than 0.5 mm and preferably not greater than 0.4 mm. Meanwhile, the FPC board 102 alone has a thickness d1 not greater than 0.2 mm and preferably of about 0.15 mm. Generally speaking, the smart card 200 has a thickness of about 0.75 to 0.8 mm.

In an embodiment not shown, the IC chip 104 is covered with a package molding material in a manner that the FPC board 102, the IC chip 104, and the package molding material covering the IC chip 104 have a combined thickness not greater than 0.5 mm.

Figure 5:
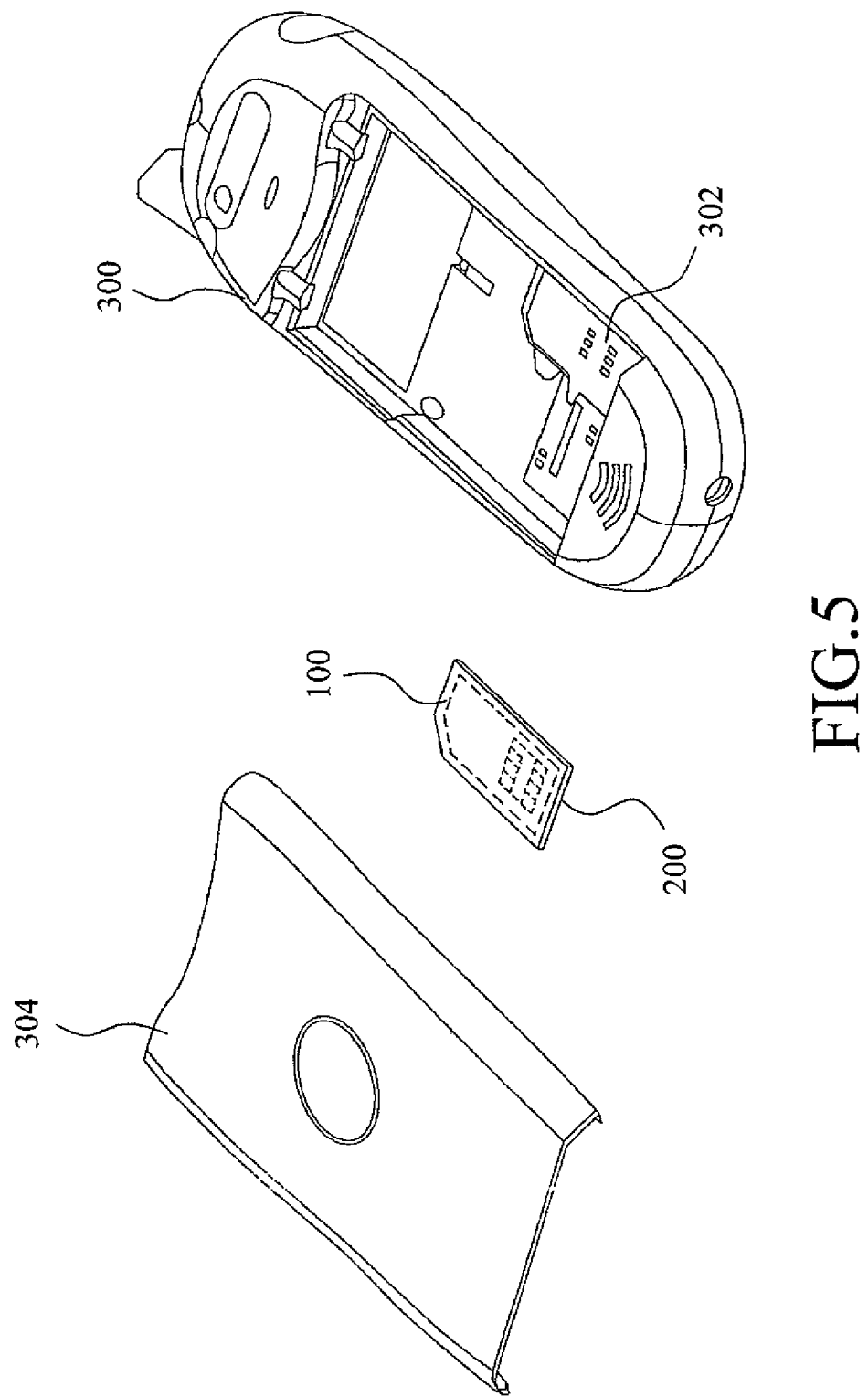
FIG. 5 is a schematic view of a mobile communication device according to a specific embodiment of the present invention.

FIG. 5 shows a mobile communication device 300 (such as a mobile phone) according to another embodiment of the present invention. The mobile communication device 300 includes a SIM/USIM card slot 302, a battery cover 304, and the SIM/USIM card 200 and the IC film 100 affixed thereto as shown in FIGS. 1-4. The SIM/USIM card 200 and the IC film 100 affixed thereto can be placed into the slot 302 as one unit and be accessed by the slot 302. Then, through the STK menu of the mobile communication device 300, functions or communication services additionally provided by the IC film 100 can be used. For possible functions or communication services provided by the IC film 100, please refer to the literature cited above; a detailed description of such functions or services is omitted herein for the sake of brevity.

Figure 6:
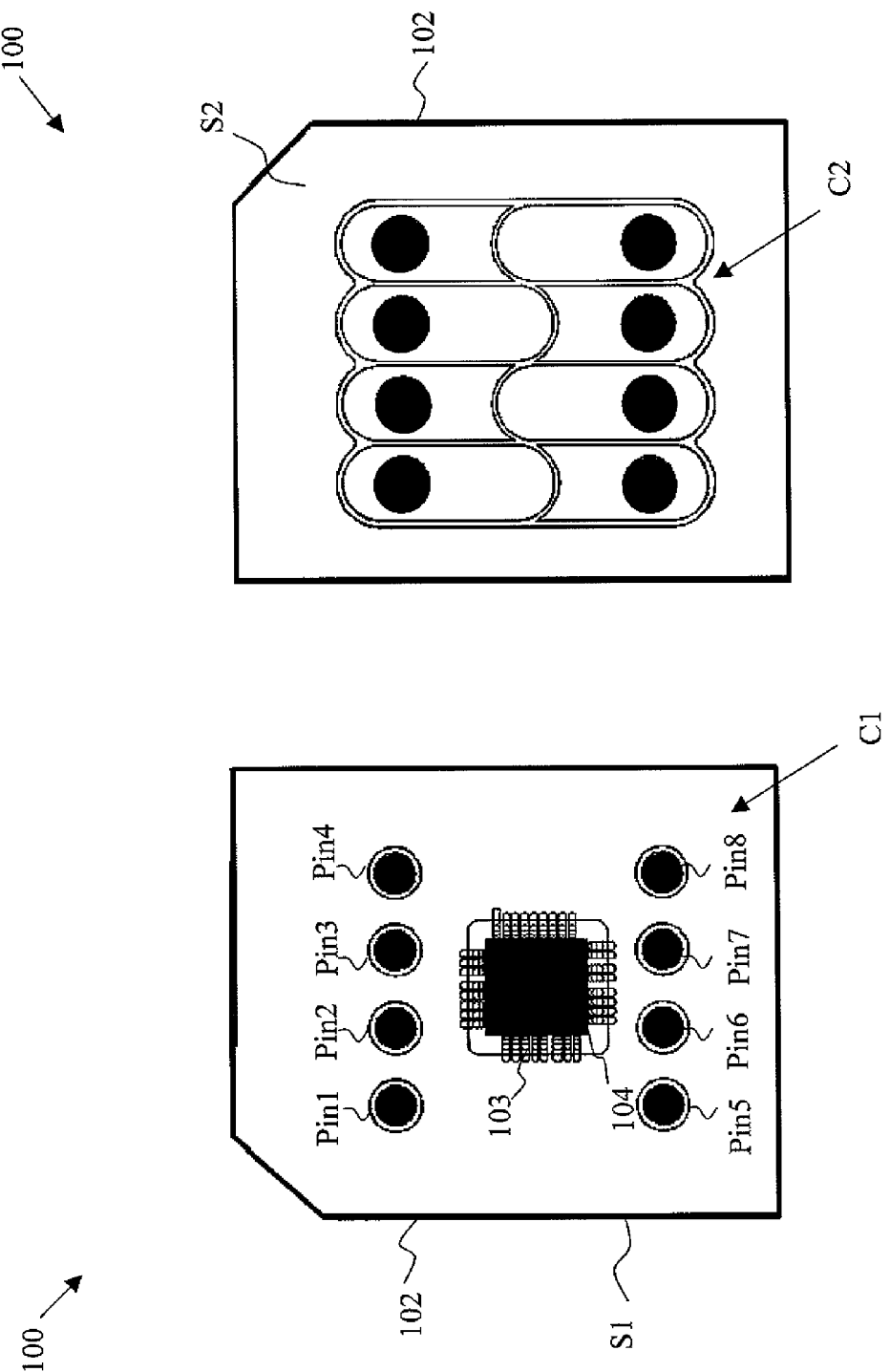
FIG. 6 is a schematic view of the integrated circuit film according to another specific embodiment of the present invention.

FIG. 6 shows a front view and a back view of the IC film 100 according to another embodiment of the present invention. The IC film 100 comprises the FPC board 102, the first set of electrical contacts C1, the second set of electrical contacts C2, and the IC chip 104. The FPC board 102 has a first side S1 and a second side S2 opposing the first side S1; the first set of electrical contacts C1 are disposed on the first side S1, and the second set of electrical contacts C2 are disposed on the second side S2. In this embodiment, the first set of electrical contacts C1 on the first side S1 are of a bump structure and are adapted to be electrically connected to a smart card 200 (shown in FIG. 7 and FIG. 8), whereas the second set of electrical contacts C2 on the second side S2 are of a recess structure. The locations of the first set of electrical contacts C1 on the FPC board 102 correspond to those of the second set of electrical contacts C2. In this embodiment, the IC chip 104 is disposed on the first side S1 of the FPC board 102 and bonded to leads 103 of the FPC board 102 to form electrical connection. However, in other embodiments not shown, the IC chip 104 can also be disposed on the second side S2 of the FPC board 102.

However, in other embodiments not shown, if the first set of electrical contacts C1 come into electrical contact with a smart card to be affixed thereto and the second set of electrical contacts C2 come into electrical contact with a conventional access device (not shown) of a smart card, the first set of electrical contacts C1 and the second set of electrical contacts C2 can be located at different positions, respectively, or can be of different shapes and structures, respectively; the present invention is not restrictive of these technical features.

Preferably, as shown in FIG. 6, the positions and structures of the first set of electrical contacts C1 conform to the ISO7816-2 standard so as for the first set of electrical contacts C1 to be electrically connected to a smart card conforming to the ISO7816 standard. Also, the positions and structures of the second set of electrical contacts C2 conform to the ISO7816-2 standard so as for the second set of electrical contacts C2 to be electrically connected to a smart card accessing device (such as a smart card reader or an SIM/USIM card slot of a mobile phone) conforming to the ISO7816 standard.

To reduce the area of the IC film 100, especially when confronted with a smart card (such as a Micro SIM card) of a small size, it is preferably feasible to position the IC chip 104 at a region between the electrical contacts on a specific side of the IC film 100. In general, the region is unlikely to be omitted from the IC film 100. Take FIG. 6 as an example, by the ISO7816-2 standard, the first set of electrical contacts C1 on the first side S1 comprise eight electrical contacts (Pins 1-8). The IC chip 104 is positioned at a region between Pins 1-4 and Pins 5-8, and the scope of the region is defined as 7.62 mm×9.32 mm approximately. Area outside Pins 1-4 and Pins 5-8 may be reduced or trimmed as needed. In particular, in the situation where the smart card 200 is a Micro SIM card or a Mini UICC card, the area of the smart card 200, which is defined as 12 mm×15 mm approximately, provides little usable area when area required for the electrical contact is taken into account. The above embodiment illustrates a good problem-solving solution. A point to note is that, although the embodiment shown in FIG. 6 is illustrative of the present invention, the present invention requires that it is sufficient to have at least two electrical contacts on a specific side of the IC film 100 and have the IC chip 104 positioned between the electrical contacts; in other words, the present invention is not restrictive of the quantity of electrical contacts or the function provided by electrical contacts. A point to note is that, although the IC film 100 shown in FIG. 6 is affixed to a smart card (such as a Micro SIM card) of a small size, the IC chip 104 is, for example, disposed outside the electrical contacts in another embodiment shown in FIG. 1 in order to work in conjunction with a conventional SIM card which usually occupies more area than a smart card does.

Figure 8:
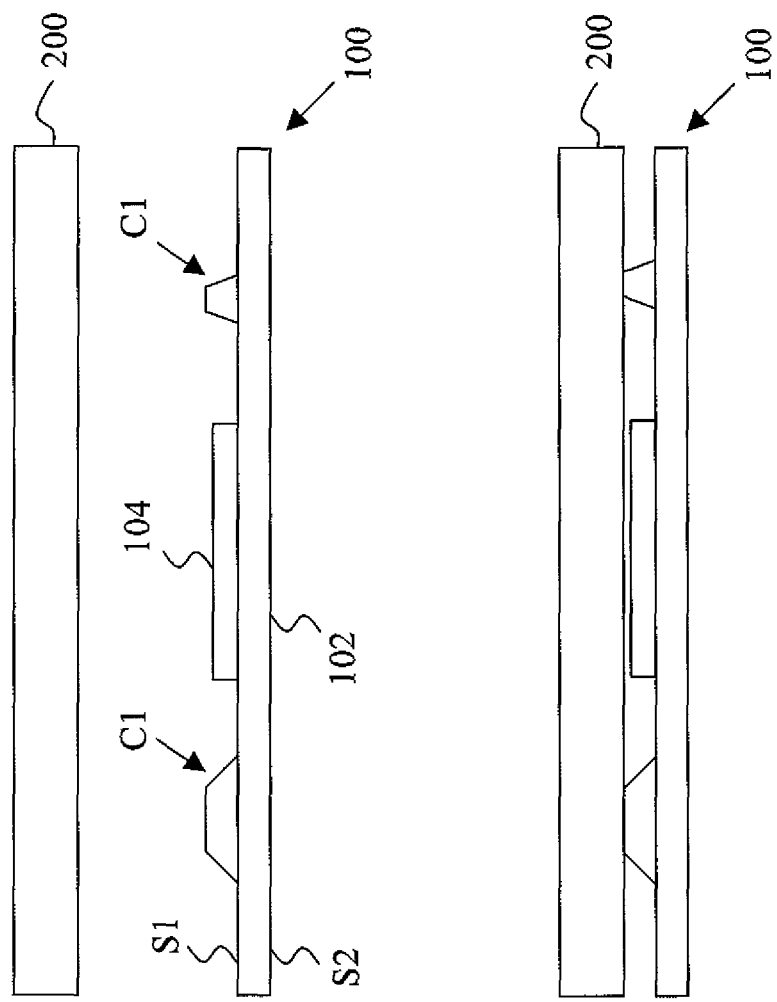
FIG. 8 is a side view of the integrated circuit film and the smart card according to another specific embodiment of the present invention.

As shown in FIG. 8, the IC chip 104 is preferably disposed on the first side S1, i.e., the side facing the smart card 200. The first side S1 is provided with a double faced adhesive tape (e.g., 3M™ VHB™ Adhesive Transfer Tape F-9460PC) for adhering to a surface of the smart card 200. When the IC film 100 is affixed to the smart card 200, the IC chip 104 as a whole is located outside the surface of the smart card 200. Hence, even if the IC chip 104 is not covered with any package molding material, the IC chip 104 can still be protected by the smart card 200, the FPC board 102, and the nearby first set of electrical contacts C1. However, as described above, the IC chip 104 can also be disposed on the second side S2, and the present invention is not restrictive of this technical feature. A point to note is that the IC chip 104 may be covered with a package molding material, and the present invention is not restrictive of this technical feature. If the IC chip 104 is covered with a package molding material, the IC chip 104 can be electrically connected to the FPC board 102 by means of a ball grid array (BGA) rather than an anisotropic conductive film (ACF) or gold-to-gold interconnection (GGI).

The IC chip 104 is directly bonded to the leads 103 of the FPC board 102 by an anisotropic conductive film (ACF) or by gold-to-gold interconnection (GGI).

Figure 7:
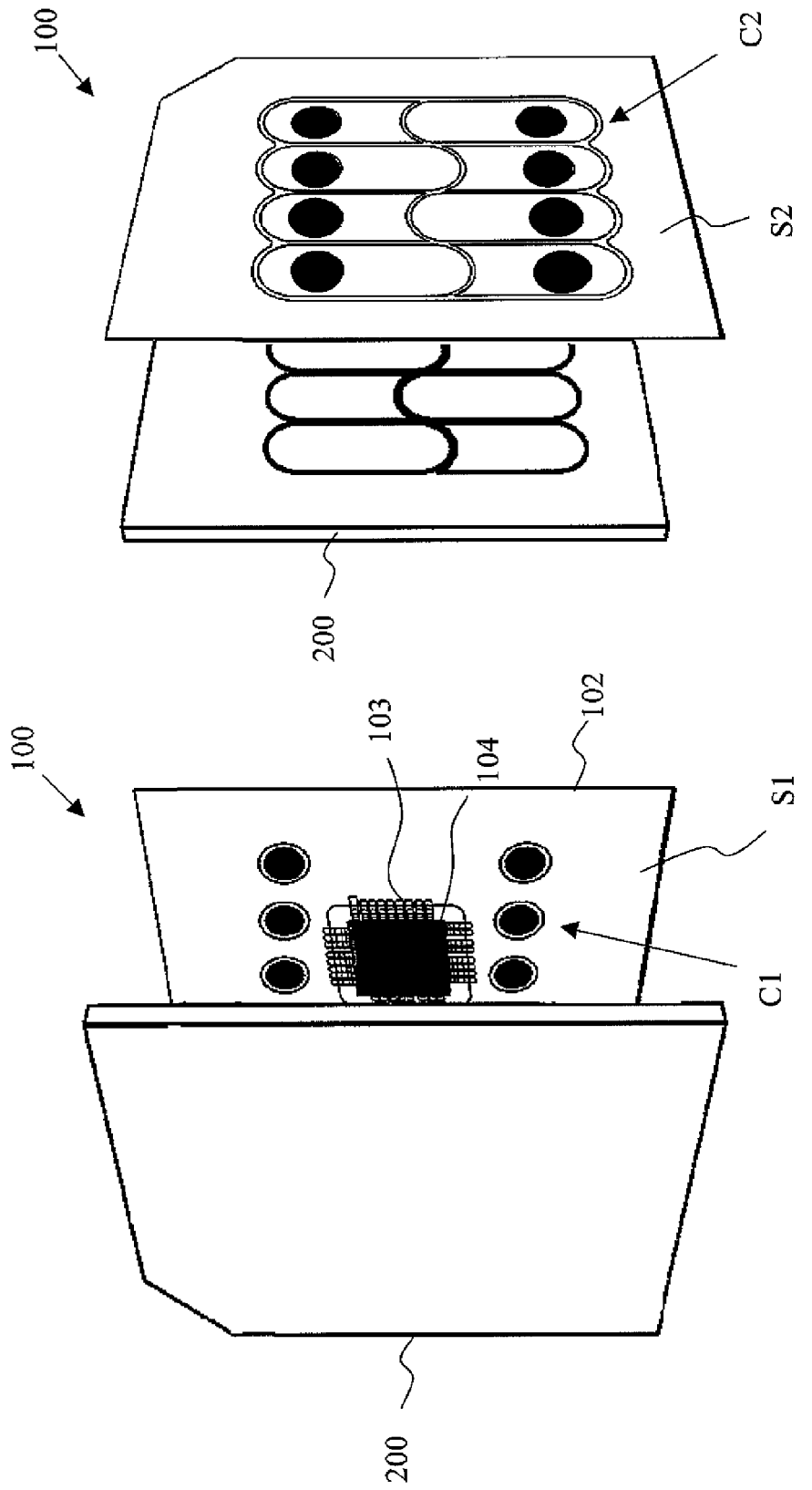
FIG. 7 is a schematic view of the integrated circuit film and the smart card according to another specific embodiment of the present invention.
Figure 9:
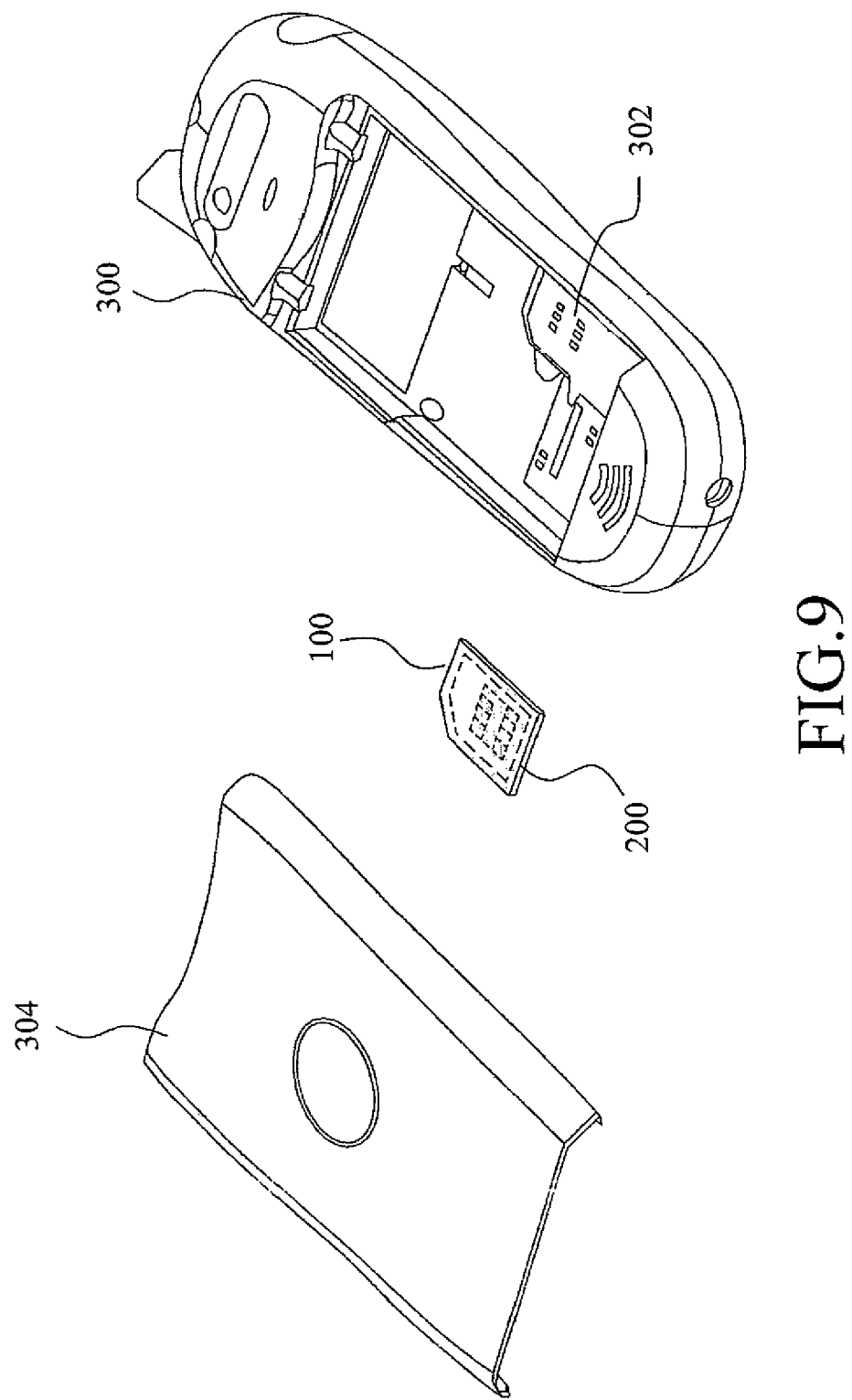
FIG. 9 is a schematic view of the mobile communication device according to another specific embodiment of the present invention.

FIG. 9 shows a mobile communication device 300 (such as a mobile phone) according to an embodiment of the present invention. The mobile communication device 300 comprises a smart card slot 302 and a battery cover 304. Also, the smart card (such as SIM/USIM/UIM/RUIM/micro SIM cards) 200 and the IC film 100 affixed thereto are shown in FIGS. 6-8. The smart card 200 and the IC film 100 affixed thereto can be placed into the slot 302 as one unit and be accessed by the slot 302. Then, functions or communication services additionally provided by the IC film 100 are available through the STK menu of the mobile communication device 300. For possible functions or communication services provided by the IC film 100, please refer to the literature cited above; a detailed description of such functions or services is omitted herein for the sake of brevity.

A point to note is that, although the smart card disclosed herein includes integrated circuit cards which conform to the ISO7816 standard (see ETSI-TS-102-221, the standard set forth by the European Telecommunications Standards Institute (ETSI) to regulate smart cards, UICC-Terminal interface, and physical and logical characteristics thereof), the disclosure of the present invention is not limited to SIM/USIM/UIM/RUIM/Micro SIM cards for use with mobile phones. Please refer to http://www.smartcardalliance.org for the examples of application of smart cards. The present invention is not restrictive of the aforesaid technical features.

Figure 10:
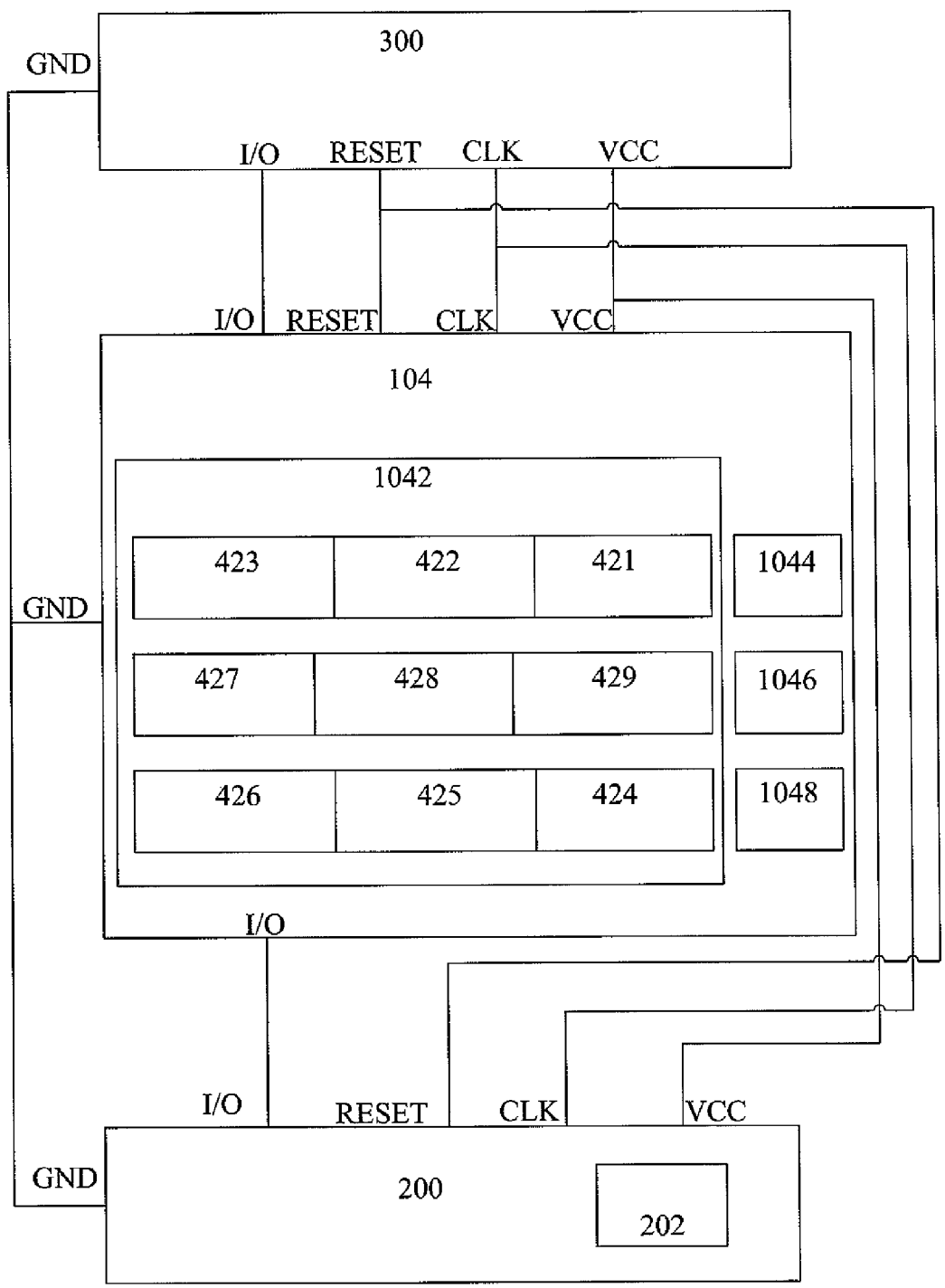
FIG. 10 and FIG. 11 are block diagrams of a circuit according to a specific embodiment of the present invention.

FIG. 10 is a block diagram of a circuit according to an embodiment of the present invention. FIG. 10 illustrates circuit connection of a terminal (such as the mobile communication device) 300, the smart card 200, and the IC chip 104 of the IC film 100 (as shown in FIGS. 1-8) to further describe the present invention. The smart card 200 comprises a memory 202 for storing a first identification data intended for carrying out a target transaction with the terminal 300 and sent from the IC chip 104 (or another circuit on the IC film 100). The IC chip 104 comprises a processor 1042 and a plurality of memories 1044-1048. For example, the memory 1044 stores a second identification data intended for carrying out a target transaction with the terminal 300. The memory 1046 stores transaction-related data. The memory 1048 stores a first personal data not protected by the smart card 200.

Figure 11:
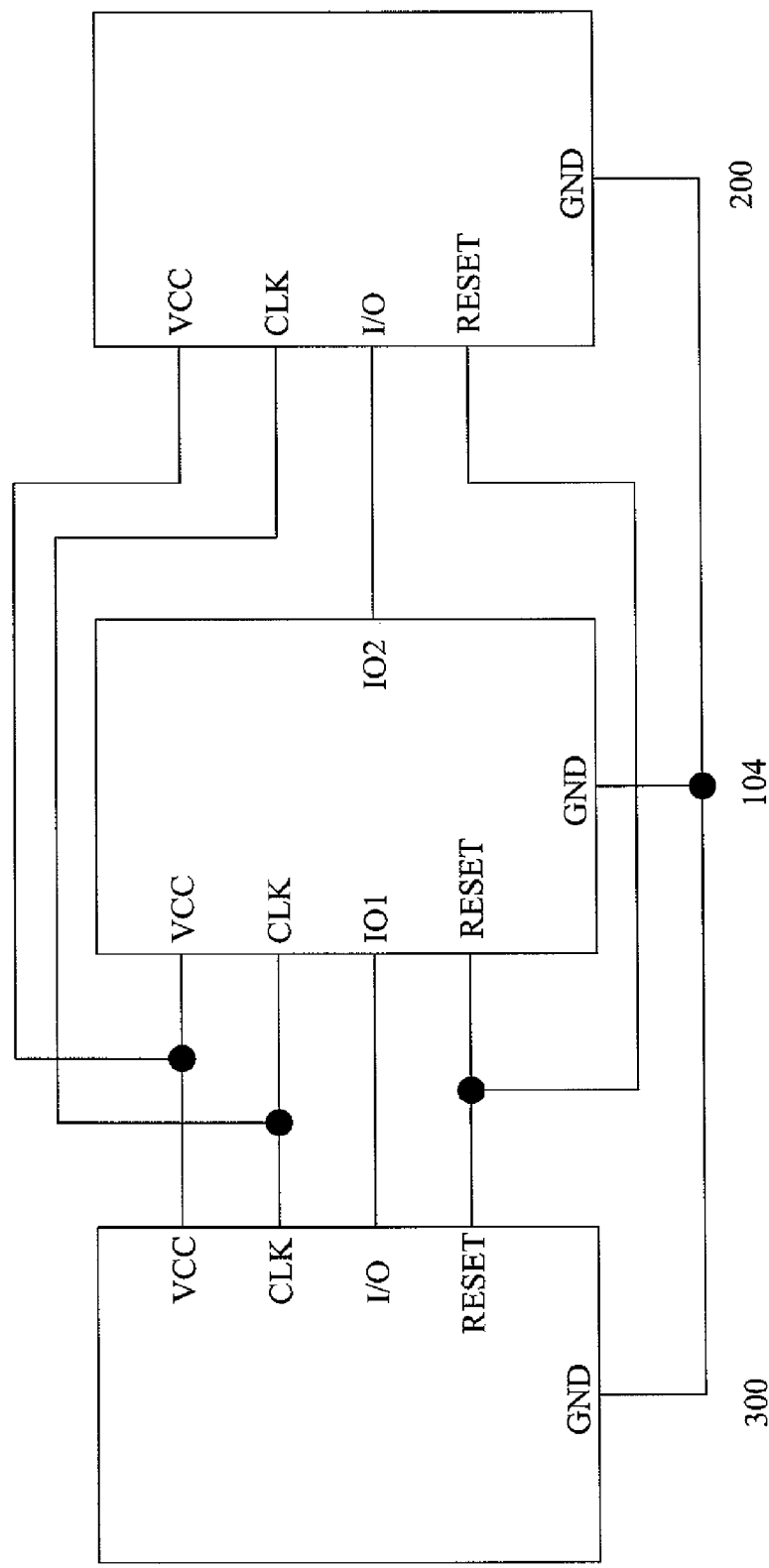

As shown in FIG. 10 and FIG. 11, the smart card 200 can be directly connected to a corresponding port of the terminal 300 by means of a power port VCC, a ground port GND, a reset signal port RESET, a clock signal port CLK, and an I/O port I/O and via a wire, but not necessarily by means of the IC chip 104. Furthermore, as described above, the terminal 300 is a portable device such as a mobile phone or is a smart card reader of a fixed terminal such as ATM and POS.

As shown in FIG. 10 and FIG. 11, the IC chip 104 comprises two said I/O ports I/O for communicating with corresponding ports of the terminal 300 and the smart card 200, respectively.

The IC chip 104 can process different data protocols of two said I/O ports I/O. In an embodiment of the present invention, the IC chip 104 sends an application protocol data unit (APDU) command to the smart card 200 via the I/O ports I/O.

In general, after receiving a reset signal, a clock signal, and a power signal from the terminal 300, the IC chip 104 sends an Answer to Reset (ATR) signal to the terminal 300 via the I/O ports I/O. The ISO/IEC 7816-3 standard gives a detailed description and definition of the data elements and data character string of the ATR signal. Please refer to the ISO/IEC 7816-3 standard for the basic format of the ATR signal (ATR); a detailed description of the ATR signal format is omitted herein for the sake of brevity.

Referring to FIG. 10 and FIG. 11, according to the present invention, the processor 1042 on the IC chip 104 comprises an ATR signal generating device 421, a first protocol generating device 422, a PTS response generating device 423, an ATR determining device 424, a second protocol generating device 425, a PTS request generating device 426, a command APDU determining device 427, a command APDU generating device 428, and a response APDU generating device 429. To begin a transaction, the terminal 300 tends, after starting, not to mind or determine whether the smart card 200 is present to thereby directly carry out a transaction procedure it sets. After receiving a command APDU from the terminal 300, the IC chip 104 determines whether the command APDU is its target transaction with regard to the smart card 200. Upon affirmative determination, the IC chip 104 checks and determines whether the smart card 200 is present in a transaction system. Upon affirmative determination, the IC chip 104 reproduces the command APDU received from the terminal 300 and intended for carrying out the target transaction with regard to the smart card 200 and sends the command APDU thus reproduced to the smart card 200 for finalizing the target transaction with regard to the smart card 200. If the IC chip 104 determines that the smart card 200 is not present, the IC chip 104 will inform the terminal 300 that the smart card 200 is absent and thus it is impossible to carry out the transaction or any other preset transaction.

Generally speaking, an Answer-To-Reset signal from the smart card 200/the IC chip 104 must occur between 400 and 40,000 clock cycles after the terminal 300 issues a reset signal. With a clock rate of 3.5712 MHz, this corresponds to an interval of 112 μs to 11.20 ms, while at 4.9152 MHz the interval is 81.38 μs to 8.14 ms. If the terminal 300 does not receive the ATR within this interval, it repeats the activation sequence several times (usually up to three times) to try to detect an ATR. If all these attempts fail, the terminal 300 assumes that the card is faulty.

However, in the conventional arts, a first reset signal which is generated by a terminal has to be directly sent to the integrated circuit chip regardless of whether the transaction is related to a smart card or an integrated circuit chip. Once the integrated circuit chip receives the reset signal from the terminal, the reset signal generating device will generate and send a second reset signal to the smart card. After receiving the second reset signal, the smart card sends a first ATR signal to the integrated circuit chip. After the integrated circuit chip has received the first ATR signal from the smart card, an ATR signal generating device of the integrated circuit chip generates and sends a second ATR signal to the terminal. As described above, the second ATR signal of the integrated circuit chip is unable to give a response for starting a transaction system within a regulated time period; a point to note is that the aforesaid technical feature was disclosed in the prior art.

One of the technical features of the present invention is: the reset signals generated by the terminal 300 are directly sent to the IC chip 104 and the smart card 200, respectively. During a time period starting from its generation by the terminal 300 and ending at its arrival at the smart card 200, the reset signal of the smart card 200 is conveyed by means of a circuit on the IC film 100 without undergoing any signal processing process, nor does it rely upon computation of the IC chip 104 or the processor 1042. Furthermore, the IC chip 104 or the processor 1042 never takes the initiative in generating and sending the reset signal to the smart card 200.

Afterward, the IC chip 104 receives and processes the ATR signal of the smart card 200 directly and sends the ATR signal to the terminal 300, concurrently. In doing so, it is feasible to prevent a response delay which might otherwise jeopardize the start of the transaction system.

After receiving the ATR signal from the ATR signal generating device 421, the terminal 300 sends a Protocol Type Selection (PTS) request signal to the IC chip 104 for performing PTS and thereby deciding a first protocol type acceptable to both the terminal 300 and the IC chip 104. Once the IC chip 104 confirms the protocol type acceptable to both the terminal 300 and the IC chip 104, the PTS response generating device 423 will generate a response, and then the first protocol generating device 422 will finish the subsequent protocol data transmission. After the IC chip 104 has received the ATR signal from the smart card 200, an ATR signal determining device 424 determines whether to change the protocol type. Upon affirmative determination, the PTS request generating device 426 of the IC chip 104 generates and sends the PTS request signal to the smart card 200 and thereby decides a protocol type acceptable to both the IC chip 104 and the smart card 200, and then the second protocol generating device 425 finishes the subsequent protocol data transmission.

The aforesaid protocol operation enables different protocols to be executed between the terminal 300 and the IC chip 104 and between the IC chip 104 and the smart card 200. Hence, in doing so, if the IC film 100 supports radio transmission, non-contact communication can take place between an antenna (not shown) of the IC film 100 and the terminal 300. Even if the smart card 200 itself does not support radio communication, transaction-related communication can still take place between the IC film 100 and the terminal 300 by means of the radio transmission function of the IC film 100.

After protocol types between the terminal 300 and the IC chip 104 and between the IC chip 104 and the smart card 200 have been decided, the terminal 300 sends a command APDU signal to the command APDU determining device 427 of the IC chip 104 to request communication and transaction. After receiving the command APDU signal, the command APDU determining device 427 determines whether the command APDU signal requests execution of a target transaction or preset transaction with regard to the smart card. If the command APDU signal generated by the terminal 300 requests a smart card target transaction, the command APDU generating device 428 of the IC chip 104 will generate and send the command APDU signal to the smart card 200. Upon completion of execution of the target transaction, the smart card 200 sends a response APDU signal to the IC chip 104. After receiving the response APDU signal from the smart card 200, the IC chip 104 executes the target transaction with regard to the smart card, and then the response APDU generating device 429 generates and sends another response APDU signal to the terminal 300 for indicating that the smart card target transaction has been finished.

After the smart card 200 and the IC film 100 affixed thereto have been placed into the terminal 300 as one unit, the IC chip 104 detects for the presence of the smart card 200 by calculating the time taken by the smart card 200 to give a response to the ATR signal.

In this embodiment of the present invention, after the terminal 300 has approved the transaction request made by the smart card 200, the IC chip 104 rewrites transaction-related data based on the first or second identification data. For example, the transaction-related data relates to the balance in the account of a stored-value card, and the balance in the account of the stored-value card can be increased/decreased by the IC chip 104 after finishing the transaction.

The present invention can be implemented in other specific forms without departing from the spirit or essential features of the present invention. The various aspects of the foregoing embodiments should be construed as illustrative rather than restrictive. Therefore, the scope of the present invention is defined by the appended claims but not by the above description. All equivalents to the claims and modifications made within the claims should fall within the scope of the present invention.

100 integrated circuit film
102 flexible printed circuit board
103 leads
104 integrated circuit chip
1042 processor
1044-1048 memories
200 smart card/SIM card
202 memory
300 mobile communication device / terminal
302 SIM/USIM card slot
304 battery cover
421 ATR signal generating device
422 first protocol generating device
423 PTS response generating device
424 ATR determining device
425 second protocol generating device
426 PTS request generating device
427 command APDU determining device
428 command APDU generating device
429 response APDU generating device
C1, C2 electrical contacts
S1, S2 sides of flexible printed circuit board
d1 thickness of flexible printed circuit board
d2 combined thickness of flexible printed circuit board and integrated circuit chip
VCC power port
GND ground port
RESET reset signal port
CLK clock signal port
I/O I/O port

What is claimed is:

1. An integrated circuit film for being affixed to a smart card, the integrated circuit film comprising:
   a flexible printed circuit board having a circuit, a first electrical interface, and a second electrical interface, wherein the second electrical interface communicates with the smart card via contacts exposed at a surface of the smart card; and an integrated circuit chip disposed on the flexible printed circuit board for communicating with a terminal via the first electrical interface and communicating with the smart card via the second electrical interface, wherein the integrated circuit chip comprises an Answer To Reset (ATR) signal generating device, wherein, after the terminal generates a reset (RST) signal, the reset signal is sent to the smart card and the ATR signal generating device via a circuit of the flexible printed circuit board, such that the ATR signal generating device generates and sends an ATR signal to the terminal.

2. The integrated circuit film of claim 1, wherein the flexible printed circuit board has a circuit for conveying the reset signal generated by the terminal to the smart card, and the integrated circuit chip does not take initiative in generating and sending the reset signal to the smart card.

3. The integrated circuit film of claim 1, wherein the integrated circuit chip further comprises a Protocol Type Selection request generating device for generating and sending a Protocol Type Selection (PTS) request signal to the smart card.

4. The integrated circuit film of claim 3, wherein the integrated circuit chip further comprises a protocol data unit signal generating device for generating and sending a protocol data unit signal to the smart card.

5. The integrated circuit film of claim 1, wherein the integrated circuit chip further comprises a Protocol Type Selection response generating device for generating and sending a Protocol Type Selection (PTS) response signal to the terminal.

6. The integrated circuit film of claim 5, wherein the integrated circuit chip further comprises a protocol data unit signal generating device for generating and sending a protocol data unit (PDU) signal to the terminal.

7. The integrated circuit film of claim 1, wherein the integrated circuit chip further comprises a determining device for determining whether a command application protocol data unit (APDU) signal generated and sent out from the terminal relates to the integrated circuit film or the smart card.

8. The integrated circuit film of claim 1, wherein the flexible printed circuit board and the integrated circuit chip have a combined thickness not greater than 0.5 mm.

9. The integrated circuit film of claim 1, wherein the integrated circuit chip is coated with a UV adhesive whereby the integrated circuit chip is fixed to the flexible printed circuit board.

10. An integrated circuit film for being affixed to a smart card, the integrated circuit film comprising:

a flexible printed circuit board having a first side and a second side opposing the first side;
a first set of electrical contacts disposed on the first side for being electrically connected to the smart card, wherein the first set of electrical contacts are for being electrical connected to contacts exposed at a surface of the smart card;
a second set of electrical contacts disposed on the second side; and
an integrated circuit chip disposed on the flexible printed circuit board and bonded to leads of the flexible printed circuit board so as to form electrical connection with the first set of electrical contacts and the second set of electrical contacts, wherein the integrated circuit chip is coated with a UV adhesive whereby the integrated circuit chip is fixed to the flexible printed circuit board.

11. The integrated circuit film of claim 10, wherein the integrated circuit chip is bonded to the leads of the flexible printed circuit board by an anisotropic conductive film (ACF).

12. The integrated circuit film of claim 11, wherein the flexible printed circuit board and the integrated circuit chip have a combined thickness not greater than 0.5 mm.

13. An integrated circuit film for being affixed to a smart card, the integrated circuit film comprising:

a flexible printed circuit board having a first side and a second side opposing the first side;
a first set of electrical contacts disposed on the first side for being electrically connected to the smart card;
a second set of electrical contacts disposed on the second side; and
an integrated circuit chip disposed on the flexible printed circuit board, covered with a package molding material, and bonded to leads of the flexible printed circuit board so as to form electrical connection with the first set of electrical contacts and the second set of electrical contacts,
wherein the flexible printed circuit board, the integrated circuit chip, and the package molding material covering the integrated circuit chip have a combined thickness not greater than 0.5 mm.

14. The integrated circuit film of claim 13, wherein the integrated circuit chip is bonded to the leads of the flexible printed circuit board by means of a ball grid array (BGA) or direct wire bonding.

15. The integrated circuit film of claim 13, wherein the first set of electrical contacts are for being electrical connected to contacts exposed at a surface of the smart card.

* * * * *